Figure 1:
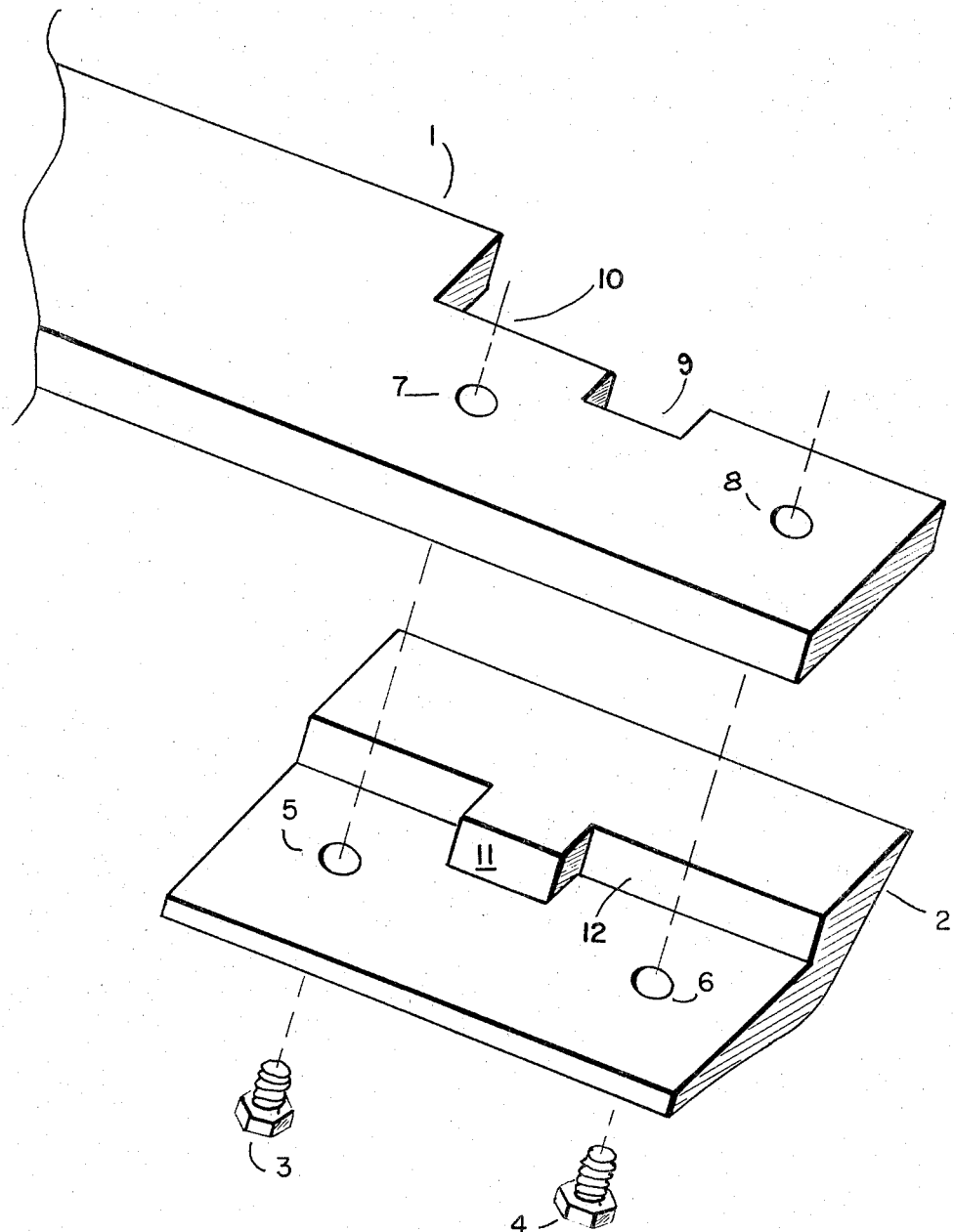

United States Patent [19]
Jones

[11] 3,769,784
[45] Nov. 6, 1973

[54] ROTARY MOWER BLADES
[76] Inventor: Stanley Adair Jones,
P.O. Box 103, Kaufman, Tex.
[22] Filed: Feb. 24, 1972
[21] Appl. No.: 182,112

[52] U.S. Cl. .............................................. 56/295
[51] Int. Cl. .......................................... A01d 55/18
[58] Field of Search ..................................... 56/295

[56] References Cited
UNITED STATES PATENTS

| | | | |
|---|---|---|---|
| 3,514,935 | 6/1970 | Bonsor | 56/295 |
| 3,327,460 | 6/1967 | Blackstone | 56/295 |
| 3,665,692 | 5/1972 | Hughes | 56/295 |
| 3,191,371 | 6/1965 | Brewer | 56/295 |

*Primary Examiner*—Louis G. Mancene
*Assistant Examiner*—Jay N. Eskovitz

[57] ABSTRACT

This invention relates to the farm implement known as a rotary mower and provides detachable cutting blades which are mounted on the modified outer ends of existing blades enabling the operator to use higher quality cutting edges and allowing easy and quick interchangeability of sharpened for dulled blades.

4 Claims, 8 Drawing Figures

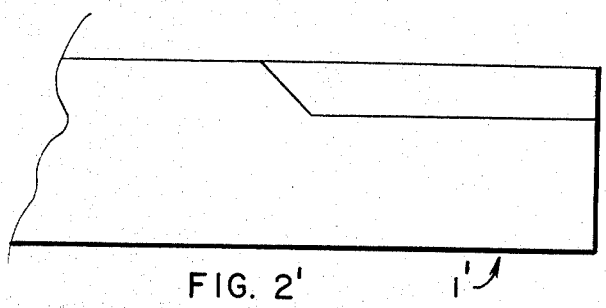
FIG. 2
FIG. 2'
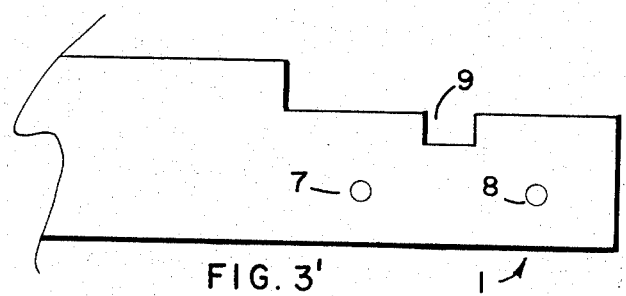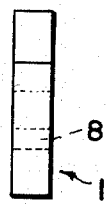
FIG. 3
FIG. 3'
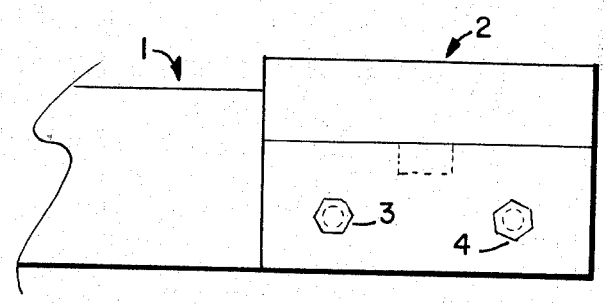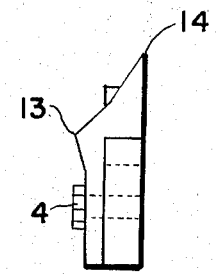
FIG. 4
FIG. 4'
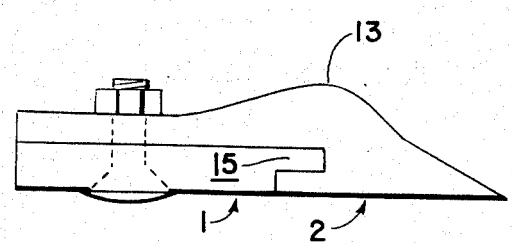
FIG. 5

ROTARY MOWER BLADES

This invention relates to rotary mowers and an improvement in the utility and cutting characteristics of same. The rotary mower referred to is the farm implement usually known as Mower, Shredder, or "Bush-Hog" (the latter being a trade name), and it is a rotary cutter usually operated by the power take-off of the tractor pulling it, and used to mow pastures, highway rights-of-way, etc., for weed and grass control, and for harvesting of crops.

These mowers vary in width from 5 to 9 feet and may weigh several thousand pounds. Existing models utilize a steel bar as the rotary blade with the outer 6 or 8 inches sharpened as cutting edges. These edges become dull rather quickly and many operators are not equipped to sharpen the blade. Due to the weight of the entire implement, it is usually necessary to pull the implement into a machine shop which has a hoist and other expensive equipment necessary for blade sharpening.

I have devised an improvement for existing mower which will:

1. Eliminate the necessity of time-consuming and costly trips into a machine shop.
2. Allow the operator to maintain an extra set of sharpened blades for replacement purposes and to change the cutting edges of his mower blade bar in several minutes.
3. Allow the manufacturer to use a higher quality ( and longer wearing ) steel alloy for the cutting blades only.

These and other objects and advantages of tis invention will more fully appear from the following description made in connection with the accompanying drawings wherein like reference characters refer to the same or similar parts throughout the several views, and in which:

FIG. 1 is an exploded view of the detachable rotary mower from the underside.

FIGS. 2 and 2' show respective end and top views of an existing unmodified cutter blade.

FIGS. 3 and 3' show respective end and top views of the modified cutter bar.

FIGS. 4 and 4' show respective end and top views of the modified cutter bar with the detachable blade.

FIG. 5 is an end view similar to FIG. 4 showing an alternative embodiment.

The invention consists of a cutter bar, 1, which can be constructed from any existing cutting bar such as 1' or from stock material, and a detachable cutter blade, 2 mounted thereto. The cutter blade is shown attached by bolts 3 and 4 but any common fastener can be used.

As clearly seen in FIG. 1, cutter bar, 1, has a notch, 10, in the rear portion of each end and a slot, 9, forming a double cut-out area. Cutter blade, 2, has a protrusion, 11, ending from a ridge, 12, and when mounted to bar 1, the protrusion 11 extends into slot 9 while ridge 12 extends along the forward surface of slot 10.

In operation the bar is rotated and cutting edge, 14, effects the cutting while airfoil, 13, which also acts to protect the fastener heads, aids the discharge of the clippings.

FIG. 5 shows an alternative embodiment. Bar 1 has the protrusion and blade 2 has the cooperating slot.

These detachable blades may be adapted to existing mowers. The blades themselves are 6 inches in width and fit flush against the front edge of the mower blade bar and with a 90° angle to continue 2½ inches across the top of the mower blade bar; a ½ inch projection in the middle of the blade fits into an indentation of the same size in the mower blade bar to provide additional security. The blades will be fastened to the mower blade bar with two bolts and self-locking nuts of the highest quality.

Insofar as the adaptation of these new blades to existing mower blade bars, it would be necessary that the sharpened surface ( of the old blade ) be cut off so as to leave a true 90° angle for flush fitting of the new blade and the drilling and tapping of two holes for installation of the bolts. A template would be provided for this conversion. Additionally, it is visualized that new blade bars will be manufactured using these new detachable blades as integral parts of the mower. The foregoing teachings have shown various figures for adapting a replaceable blade to a mowing machine. With this information, it is obvious that a replaceable blade may be attached to a mower blade bar or other cutting devices using a multitude of mechanical configurations. It should then be clear that the dimensions and the figures discussed are only for means of explaining the invention.

What I claim is:

1. An improved cutter blade assembly comprising a cutting bar with cutter blades removeably attached at each end, each cutter blade attached to and above said cutter bar by mounting means, said mounting means including a slot and notch at the rear of said cutter bar and a ridge and projection on said cutter blade, said projection extending into said slot and said ridge extending along the forward surface of said notch.

2. A cutter blade assemble of claim 1 wherein said mounting means also included holes in said cutter bar aligned with holes in said cutter blade and fastners extending therethrough.

3. A cutter blade assembly of claim 2 wherein said fasteners are bolts with taps on their ends.

4. A cutter blade assembly of claim 3 including an airfoil integral with said cutter blade and adjacent said taps for protection of said taps.

* * * * *